Sept. 21, 1926.
A. M. KROCZEK
BIRDCAGE
Filed August 1, 1924
1,600,891
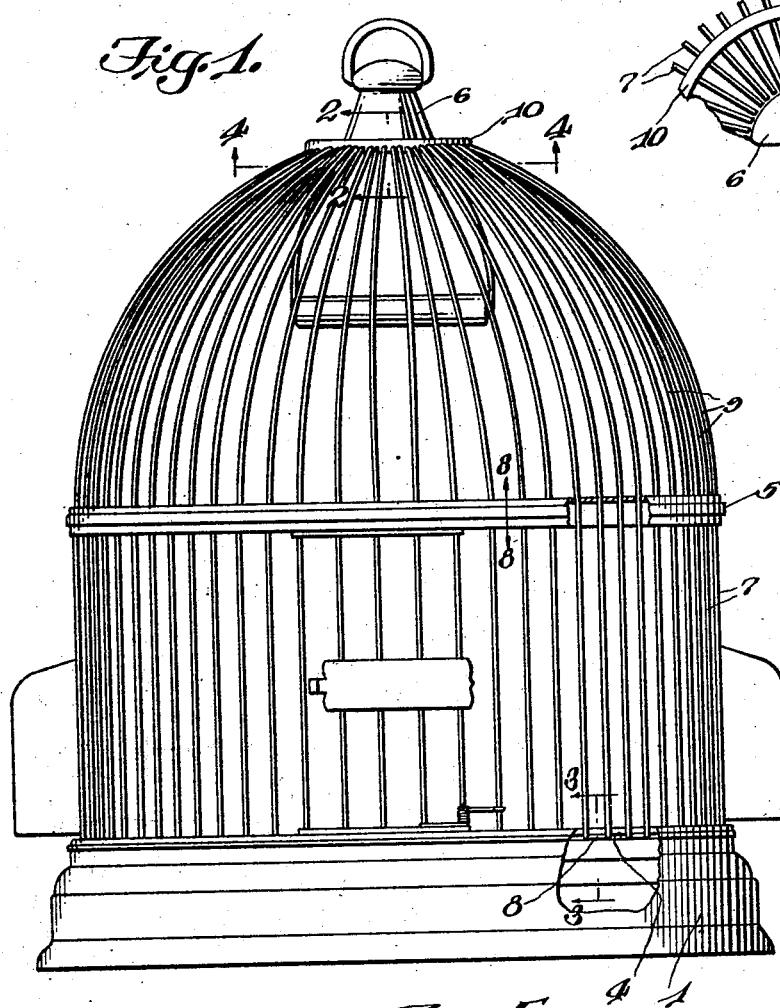
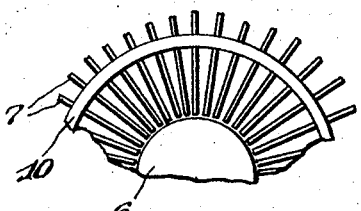
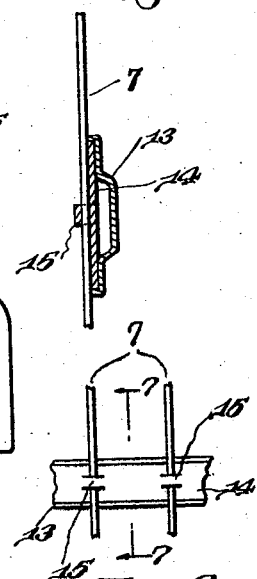
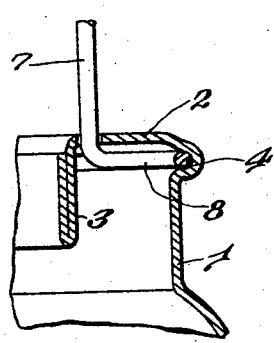
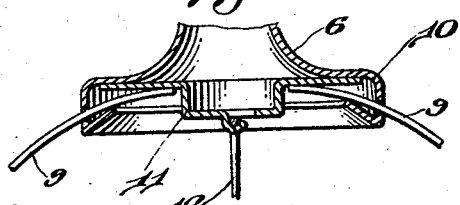
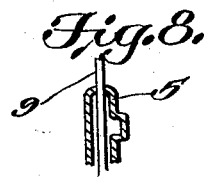
A. M. Kroczek
INVENTOR
BY Victor J. Evans
ATTORNEY Patented Sept. 21, 1926.

1,600,891

UNITED STATES PATENT OFFICE.

ANTON M. KROCZEK, OF CHICAGO, ILLINOIS.

BIRDCAGE.

Application filed August 1, 1924. Serial No. 729,585.

This invention relates to a bird cage and has for its primary object the construction of a bird cage of more substantial design in which the various parts are so constructed and assembled that soldering is practically eliminated.

Another object of the invention is the arrangement of parts so that any part may be readily renewed.

Besides the above my invention is distinguished in the shape and arrangement of wire strands so that they will be rigidly held in place.

With these and other objects in view the invention will be better understood from the following detailed description taken in connection with the accompanying drawings wherein:

Fig. 1 is a side elevation of a bird cage constructed in accordance with my invention.

Fig. 2 is a sectional view on the line 2—2 of Fig. 1.

Fig. 3 is an enlarged sectional view on the line 3—3 of Fig. 1.

Fig. 4 is a sectional view on the line 4—4 of Fig. 1 looking upwardly.

Fig. 5 is a perspective view of the yoke portion of one of the wire strands.

Fig. 6 is a detailed view of another form of band.

Fig. 7 is a sectional view on the line 7—7 of Fig. 6.

Fig. 8 is a sectional view on the line 8—8 of Fig. 1.

Again referring to the drawing illustrating one of the many constructions of my invention the numeral 1 designates a base or base ring having a horizontal flange 2 and depending lip 3 a continuation of the flange and contiguous to the flange is an annular groove 4 for the purpose hereinafter described.

The numeral 5 designates a band U shaped in cross section positioned intermediate the base 1 and cap 6. A plurality of wire strands 7 of U shaped formation each has its yoke portion 8 bent laterally to engage under the horizontal flange 2 and be seated in the groove 4 as clearly shown in Fig. 3.

The limbs 9 of the wire strands pass upwardly through the holes in the band 5 and have their ends pass through the rim 10 of the cap so as to engage under the cap. A plate 11 covers such exposed ends. Attached to the plate 11 is the usual swing 12.

In Figures 6 and 7 I have shown the band 13 of different formation having seated therein a ring insert 14 that is provided with ears 15 through which the limbs of the wire strands pass.

From the foregoing description taken in connection with the accompanying drawing it will be apparent that I provide a bird cage construction having the required rigidity in which the parts are so connected that they may be readily arranged in place with very little effort and the use of solder is dispensed with.

It is, of course to be understood the shape of the base rim may be changed and the wire strands associated in other relations and attached to the cap in different manners than illustrated, therefore, I do not desire to be limited in any manner except as set forth in the claims hereunto appended.

Having thus described my invention what I claim is:

1. A bird cage comprising a base having a flange and a groove contiguous to the flange, a plurality of wire strands forming the body of the bird cage and having portions looped under said flange and set in said groove, said strands having their free ends clamped together.

2. A bird cage comprising a base having a horizontal flange, a depending lip a continuation of the flange, and an annular groove contiguous to the flange, a band U shaped in cross section, a cap and a plurality of wire strands of U shape formation with the yoke portions bent at an angle to engage under said flange and seat in said groove with the intermediate portion passing through the band and their ends fixed to said cap.

In testimony whereof I affix my signature.

ANTON M. KROCZEK.